United States Patent
Fan et al.

(10) Patent No.: US 7,655,066 B2
(45) Date of Patent: Feb. 2, 2010

(54) NITROGEN REMOVAL FROM MOLTEN METAL BY SLAGS CONTAINING TITANIUM OXIDES

(75) Inventors: Peng Fan, Salt Lake City, UT (US);
Weol D. Cho, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 315 days.

(21) Appl. No.: 11/453,302

(22) Filed: Jun. 13, 2006

(65) Prior Publication Data

US 2006/0289095 A1    Dec. 28, 2006

Related U.S. Application Data

(60) Provisional application No. 60/690,173, filed on Jun. 13, 2005, provisional application No. 60/691,371, filed on Jun. 16, 2005.

(51) Int. Cl.
*C22B 9/00* (2006.01)
(52) U.S. Cl. .............................. 75/406; 75/531; 75/560; 148/625
(58) Field of Classification Search .................. 75/406, 75/531, 628, 235, 313, 392, 414, 433, 507, 75/508, 528, 560; 148/625
See application file for complete search history.

(56) References Cited

U.S. PATENT DOCUMENTS 3,507,644 A * 4/1970 Coyle .......................... 420/15

| | | |
|---|---|---|
| 4,572,737 A | 2/1986 | Robinson et al. |
| 4,695,318 A | 9/1987 | Knauss, Jr. et al. |
| 5,364,588 A | 11/1994 | Finkl et al. |

FOREIGN PATENT DOCUMENTS

| | | | |
|---|---|---|---|
| JP | 01042514 A | * | 2/1989 |
| JP | 03236434 A | * | 10/1991 |
| JP | 06192723 A | * | 7/1994 |

OTHER PUBLICATIONS

Machine translation of JP 06-192723 (1994).*
Pitkala, Jyrki et al., CFD Modeling of Nitrogen Dissolution into a Steel Bath During Gas Purging, Second International Conference on CFD in the Minerals and Process Industries, pp. 35-40, CSIRO, Dec. 6-8, 1999.
Kumar, Dr. RV, Pat III Materials Science and Metallurgy, M3 Extraction and Recycling, Michaelmas 2004 (12 Lectures), 37 pages.

(Continued)

*Primary Examiner*—George Wyszomierski
*Assistant Examiner*—Vanessa Velasquez
(74) *Attorney, Agent, or Firm*—Thorpe North & Western LLP (57) ABSTRACT

The invention relates to titanium oxide containing slag compositions and associated methods for reducing the nitrogen content of metals. The titanium oxide slag compositions can be used to reduce nitrogen content in various molten metals including steel, nickel, copper, iron, and the like. The nitrogen content of the metals can be reduced by contacting the metal with the titanium oxide containing slag composition. The slag compositions are capable of reducing the nitrogen content of steel to less than 20 ppm without the need for specialized high-quality starting materials or processing equipment.

14 Claims, 6 Drawing Sheets

OTHER PUBLICATIONS

Nomura, K. et al., Removal of Nitrogen from Steel Using Novel Fluxes, Metalurgical Transactions B, Dec. 1991, vol. 22 B, 8 pages.

R. Inoue and H. Suito, Thermodynamic studies on steel denitrization by flux, The Institute of Metals, 1988, Glasgow, pp. 77-80.

K. Tomioka and H. Suito, Nitride capacities in CaO-SiO and CaO-SiO-AlO melts, Steel Research, 1992, vol. 63, pp. 1-6.

K. Ito and R.J. Fruehan, Thermodynamics of Nitrogen in CaO-SiO-AlO Slags and Its Reaction with Fe-C Melts, Metallurical Transactions B, 1988, vol. 19B, pp. 419-425.

H. Sakai and H. Suito, Nitride Capacities in the CaO-base Ternary Slags at 1873K, ISIJ International, 1996, vol. 36, pp. 143-149.

D.J. Min and R.J. Fruehanan, Nitrogen Solution in BaO-BO and CaO-BO Slags, Metallurical Transactions B1990, vol. 21B, pp. 1025-1032.

J. Tanabe and H. Suito, Thermodynamics of nitrogen in Ca0-TiO slags, Steel Research, 1993, vol. 63, pp. 515-520.

S.W. Cho and H. Suito, Thermodynamics of Oxygen and Nitrogen in Liquid Nickel Equilibrated with CaO-Tio and CaO-Tio-AlO Melts, Metallurical Transactions B, 1994, vol. 25B, pp. 5-13.

M. Sasagawa, B. Ozturk and R.J. Fruehan, Removal of Nitrogen by BaO-TiO Based Slags, Ironmaking and Steelmaking, 1990, vol. 17, pp. 51-57.

K. Tomioka and H. Suito, Thermodynamics of the Removal of Nitrogen From Steel Using Titania-Based Fluxes, Trasactions of the ISS, Mar. 1994, pp. 83-89.

F. Tamura and H. Suito, Thermodynamics of Oxygen and Nitrogen in Liquid Iron Equilibrated with CaO-SiO-AlO Slags, Metallurgical Transactions B, 1993, vol. 24B, pp. 121-130.

* cited by examiner

NITROGEN REMOVAL FROM MOLTEN METAL BY SLAGS CONTAINING TITANIUM OXIDES

RELATED APPLICATIONS

The present application claims the benefit of U.S. Provisional Patent Application Ser. No. 60/690,173, filed Jun. 13, 2005 and U.S. Provisional Patent Application Ser. No. 60/691,371 filed Jun. 16, 2005, which are each incorporated herein by reference in their respective entireties.

BACKGROUND OF THE INVENTION

The control of nitrogen has become extremely important in view of its influence on chemical, mechanical and physical properties of steel and other metals. For example, nitrogen in steel causes poor deep drawability of thin sheets and low toughness of thick plates. Nitrogen content also affects the magnetic, electrical and welding properties of sheet steel. The hardness, abrasion-resistance and corrosion performance is also affected by the presence of nitrogen. Nitrogen may also be one of the causes of porosity because of gas evolution during solidification. In combination with aluminum, as aluminum nitride, it can be the direct cause of intergranular fracture of cast steel. Thus, nitrogen has been known as a detrimental element in many steels and other metals and its content should be reduced to a minimum. Conventional steel making processes are capable of reducing nitrogen content to less than 40 ppm. However such processes are generally incapable of reducing the nitrogen content in steel and other metals to less than about 20 ppm unless special expensive high quality starting materials are used.

In principle, two methods have been attempted to remove nitrogen from molten steel and other metals. They are vacuum degassing and flux treatment. Vacuum degassing was first tested to remove nitrogen from molten steel, since hydrogen in molten steel can be effectively removed by vacuum degassing to about 1 ppm. Unfortunately, however, vacuum degassing has been found to be an ineffective method for nitrogen removal, since only 10-30% of nitrogen in molten steel can be removed by vacuum degassing process. The significant difference in efficiency between nitrogen removal and hydrogen removal is attributed to nitrogen's smaller diffusion coefficient in molten steel. Therefore, research has focused on searching for slag systems that will effectively remove nitrogen from molten steel and other metals.

Extensive research was conducted for dozens of binary, ternary or multi-component slag systems containing CaO, BaO, MgO, $Al_2O_3$, $SiO_2$, $B_2O_3$, $CeO_2$, $ZrO_2$, and $TiO_2$ and many other oxides to discover effective slag systems for nitrogen removal from molten steel. Most of the studies attempted to measure nitride capacity as one of the indexes to express the ability of a slag to remove nitrogen. Despite progress made by previous studies, further efforts are required to find more effective slag systems.

SUMMARY OF THE INVENTION

It would therefore be advantageous to develop improved materials and methods which produce metals having reduced nitrogen content. In one aspect of the present invention, a method of removing nitrogen from molten metal can include placing a slag composition including a titanium oxide in contact with a molten metal mass. The titanium oxide can have the formula $TiO_x$, where x is from 1 to 1.5.

The slag composition and metal mass can be subjected to a temperature and time sufficient to substantially melt the metal mass such that nitrogen in the metal mass migrates toward the slag composition to form a denitrogenated metal. Typically, the metal mass can be steel such as carbon steel; however, the slag compositions in accordance with embodiments of the present invention can also be useful in removal of nitrogen from metals such as, but not limited to, nickel, iron, copper, alloys thereof, or other commercially useful metals.

In another aspect, a slag composition for use in the denitrogenation of metals can include about 10 wt % to about 40 wt % titanium oxide and at least one metal oxide. The titanium oxide has the formula $TiO_x$, where x is from 1 to 1.5.

Additional features and advantages of the invention will be apparent from the following detailed description, which illustrates, by way of example, features of the invention.

It should be noted that the figures are merely exemplary of several embodiments of the present invention and no limitations on the scope of the present invention are intended thereby.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

Definitions

In describing and claiming the present invention, the following terminology will be used.

The singular forms "a," "an," and "the" include plural references unless the context clearly dictates otherwise. Thus, for example, reference to "a slag composition" includes reference to one or more of such materials, and "a steel mass" includes reference to one or more of such materials. Similarly, reference to a "heating step" includes one or more such steps.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, "slag" refers to a metal oxide containing molten material which, when placed in contact with a molten metal, is capable of reducing the nitrogen content of the molten metal. Generally a slag can be a second distinct molten phase which is substantially not miscible or soluble in the molten metal, although some diffusion of material from the slag is acceptable as long as the resultant composition in the molten metal is within product requirements.

As used herein, "$TiO_x$" (x=1 to 1.5) refers to a titanium oxide having a value of x as indicated. An x value between 1 and 1.5 reflects the co-existence of $TiO_{1.5}$ (i.e. $Ti_2O_3$) and TiO. When x is equal to 1 then the titanium oxide is pure TiO. When x is 1.5 then the titanium oxide is entirely $Ti_2O_3$. Values of x which fall between 1 and 1.5 represent average titanium to oxygen ratios found in a mixture of titanium oxides.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

Invention

The present invention provides slag compositions and associated methods of removing nitrogen from metals such as steel or other suitable metals. The method can include placing a slag composition including a titanium oxide in contact with a metal mass. The slag compositions of the present invention can be used in different forms including mixtures of solid powders of titanium oxides and metal oxides, molten oxide solution of the above oxides, or powders or lumps formed by crushing the solidified oxide solution of the above oxides. The titanium oxide included in the slag composition can have the formula $TiO_x$, where x is from about 1 to about 1.5. Generally, it has been discovered that titanium oxides with low titanium to oxygen ratios provide better nitrogen removal. Hence, in the formula $TiO_x$, when x is 1 the nitrogen removal rate is typically better than when x is 1.5. In one embodiment of the present invention the x is from about 1 to less than 1.5. In another embodiment x is from about 1 to less than 1.3. In another embodiment x is about 1. Preferred titanium oxides include TiO, $Ti_2O_3$, and combinations thereof. In another alternative aspect, the slag composition can be substantially free of titanium oxides having an x greater than 1.5.

The slag compositions of the present invention can include any amount of the above titanium oxides which is effective to remove nitrogen. However, as a general guideline the slag compositions can include from about 5 wt % to about 45 wt %, preferably from about 10 wt % to about 40 wt %, and most preferably from about 18 wt % to about 30 wt % of titanium oxides. The remainder of the slag composition can be a carrier which can include any filler or additives which do not detrimentally affect nitrogen removal capacity. Typical fillers can include metals, metal or semi-metal oxides, or the like which can lead to a slag with a melting point lower than that of the titanium oxide component, i.e., 1750° C. for TiO and 1843° C. for $Ti_2O_3$. In one embodiment, the carrier can consist essentially of metal oxides and preferably calcium oxide and aluminum oxide. In another embodiment, the carrier can consist essentially of metal oxides excluding titanium oxides with x greater than 1.5. Non-limiting examples of suitable fillers can include oxides of aluminum, calcium, magnesium, silicon, barium, or the like. Currently preferred fillers include calcium oxide and aluminum oxide. As a result, the overall melting temperature is reduced such that the titanium oxide dissolves into, or otherwise melts with the carrier, e.g. as in a liquid phase eutectic. Most often the melting point of the slag composition can be lower than about 1700° C., and preferably lower than about 1600° C. Additives can include reactive metals such as titanium, aluminum, silicon, or the like which can enhance nitrogen removal.

When the slag compositions of the present invention are placed in contact with a metal mass the slag composition and the metal mass can be heated to a temperature and for a sufficient time to substantially melt the metal mass and slag composition. Preferably the temperature is above the melting point of the metal mass. There are a variety of methods known in the art which can be used to bring the slag composition into contact with the metal mass. In one embodiment, the slag composition can be injected into the metal mass, preferably into a molten metal mass. The injection can be accomplished by any means known in the art such as an injection lance.

By melting the metal mass the nitrogen in the metal mass can more readily migrate from the metal to the slag composition thereby reducing the amount of nitrogen in the metal mass. The denitrogenated metal mass can then be recovered separately from the slag composition. Although the slag compositions of the present invention are effective to remove nitrogen from steel, they can also be used to remove nitrogen from other metals. Non-limiting examples of metals which can be denitrogenated using the slag compositions and associated methods of the present invention include nickel, copper, iron, alloys of these metals, and the like. With regard to the removal of nitrogen from steel, the present invention is capable of reducing the nitrogen content of steel to below 20 ppm without the need of the special high-quality starting materials and processing equipment required by conventional nitrogen removal processes capable of achieving similar nitrogen concentrations. In one embodiment, the slag compositions of the present invention can reduce the nitrogen content in steel to less than 10 ppm. In yet another embodiment, the slag compositions can reduce the nitrogen content of steel to less than 5 ppm.

The amount of the slag compositions used to remove nitrogen from a metal mass can vary depending on the desired removal capacity, the compositional makeup of the slag, and the compositional elements of the metal itself. For example, if Ti pick-up is undesirable, it is better to use a starting material with low concentration of Aluminum. In one embodiment, the slag to metal mass weight ratio would be between 1:20 and 1:500, and preferably from about 1:50 to about 1:200. For example, one kilogram of a typical steel having 100 ppm nitrogen content can be effectively treated to below 20 ppm nitrogen using 5 gram to 20 gram of slag at 20% TiO. The following calculations provide a basis for understanding the nitrogen capacity of the slag compositions as well as the nitrogen distribution ratio between the slag composition and the metal mass.

For denitrogenation equilibrium between gas and the slag composition, the reaction can be expressed as

$$\frac{1}{2}N_2(g) + \frac{3}{2}(O^{2-}) = \frac{3}{4}O_2(g) + (N^{3-}) \tag{1}$$

where the parentheses indicate the species dissolved in the slag composition and g indicates the species in gas phase. The nitride capacity for slag-gas reaction, $C_N$, can be expressed by Eq. (2), $$C_N = \frac{Ka_{O^{2-}}^{3/2}}{f_{N^{3-}}} = \frac{(\% N)p_{O_2}^{3/4}}{p_{N_2}^{1/2}} \tag{2}$$

where K is the equilibrium constant for Eq. (1); (% N), $a_O^{2-}$ and $f_N^{3-}$ represent nitrogen content, oxygen ion activity and nitrogen ion activity coefficient in slag phase, respectively; $P_{O_2}$ is the oxygen partial pressure, i.e., oxygen potential in gas phase; $P_{N_2}$ is the nitrogen partial pressure in gas phase. It has also been found that no considerable amount of nitrogen can be removed from molten steel by slag without very low oxygen potential.

For denitrogenation equilibrium between molten metal and the slag composition, the reaction may be written as $$\underline{N}+(O^{2-})=(N^{3-})+\underline{O} \tag{3}$$

where the underlined elements are dissolved in metal phase and the parentheses indicate the species dissolved in slag phase. Using 1 wt % standard state for nitrogen, the nitride capacity for slag-metal reaction, $C'_N$, can be expressed by Eq. (4), $$C'_N = \frac{K'a_{O^{2-}}^{3/2}}{f_{N^{3-}}} = \frac{(\% N)p_O^{3/4}}{(\% \underline{N})f_{\underline{N}}} \tag{4}$$

where K' is the equilibrium constant for Eq. (3); (% $\underline{N}$), $a_{\underline{O}}$ and $f_{\underline{N}}$ represent nitrogen content, oxygen potential and nitrogen activity coefficient in metal phase, respectively.

The relationship between $C_N$ and $C'_N$ is derived from the Gibbs free energy of dissolution of gaseous oxygen and nitrogen into metal as follows:

$$\log C_N = \log C'_N - 1.48 - 9374/T \tag{5}$$

Though nitride capacity is usually used to compare the nitrogen removal capability of various slags, the nitrogen distribution ratio, $L_N$, between slag and metal is a direct index to measure the capability of a slag to remove nitrogen from metal. $L_N$ is dependent on nitride capacity, $C'_N$, oxygen potential, $a_{\underline{O}}$, and nitrogen activity coefficient, $f_{\underline{N}}$, as shown in the following equation, $$L_N = \frac{(\% N)}{(\% \underline{N})} = C'_N \frac{f_{\underline{N}}}{a_{\underline{O}}^{3/2}} \tag{6}$$

From Eq. (6), it is recognized that the nitrogen distribution ratio is a function of temperature, metal and slag compositions, since the nitride capacity of a slag depends on temperature and slag composition. Both oxygen potential and nitrogen activity coefficient in metal phase depend on temperature, metal and slag composition. In order to obtain a nitrogen distribution ratio high enough for practical nitrogen removal, a slag with a sufficiently high nitride capacity is desirable. Eq. (6) also indicates the effect of oxygen potential on nitrogen distribution ratio—the lower the oxygen potential, the higher the nitrogen distribution ratio. From the standpoint of practical application, oxygen potential corresponding to 0.05 wt % Al in molten steel is generally selected to compare $L_N$ of different slags and estimate the nitrogen removal capability of a slag from molten steel, since 0.05 wt % of Al content is common in deoxidized molten steel.

Nitrogen distribution ratio can be calculated from nitride capacity using Eq. (6), provided that oxygen potential is available. However, while the contents of metallic elements such as Al in molten steel are usually available in slag-metal equilibration experiment and during the steelmaking process, oxygen potential is usually unavailable. In principle, oxygen potential can be calculated from the controlling redox pair such as $\underline{Al}/(Al_2O_3)$, but the pre-requisite value of the activity of relevant oxides in slag is unavailable for most slag systems. Therefore, it is not possible to obtain nitrogen distribution ratio from nitride capacity for most slag systems. Accordingly, it is desirable to find another slag property that expresses the nitrogen removal ability, provided the content of the oxygen-potential-controlling element like Al in molten steel is given. The following discussion will demonstrate that the activity coefficient of nitride in slag is a suitable property of slag for this purpose.

For metal containing Al, the nitrogen equilibrium between metal and slag can be described by Al and N in metal and AlN in slag as $$(AlN) = \underline{Al} + \underline{N} \tag{7}$$

$$K_{AlN} = \frac{a_{\underline{Al}}a_{\underline{N}}}{a_{AlN}} = \frac{f_{\underline{Al}}(\% \underline{Al})f_{\underline{N}}(\% \underline{N})}{r_{AlN}x_{AlN}} \tag{8}$$

-continued $$K_{AlN} = \exp\left(\frac{-12900}{T} + 5.62\right) \quad (9)$$

where $K_{AlN}$ is the equilibrium constant; $a_{Al}$, $f_{Al}$ and $a_{N}$, $f_{N}$ are the activity and activity coefficient of Al and N in metal, respectively; $a_{AlN} r_{AlN}$ and $x_{AlN}$ represent the activity, activity coefficient and molar fraction of AlN in slag, respectively. The relationship between the nitrogen distribution ratio of slag and metal and activity coefficient of AlN can be derived from Eq.(8) as $$r_{AlN} = \frac{(\% \underline{Al}) f_{\underline{N}} f_{\underline{Al}}}{L_N K_{AlN} (M_{slag}/100 M_N)} \quad (10)$$

where $M_{slag}$ and $M_N$ are the average molar weight of slag and the molar weight of N atom, respectively. When the nitrogen distribution ratio between a specific slag and a metal with known Al content has been measured, the activity coefficient of AlN can be obtained from Eq.(10). On the other hand, nitrogen distribution ratio between a slag with a known activity coefficient of AlN and a metal with a given Al content can be readily obtained by the following relation:

$$L_N = \frac{(\% \underline{Al}) f_{\underline{N}} f_{\underline{Al}}}{r_{AlN} K_{AlN} (M_{slag}/100 M_N)} \quad (11)$$

Eq.(11) indicates that $L_N$ is inversely proportional to $r_{AlN}$, i.e., the nitrogen distribution ratio increases as the activity coefficient of AlN in a slag decreases. Therefore, the $r_{AlN}$ of a slag is a more suitable index than the nitride capacity $C_N$ and $C'_N$ of the slag to determine the nitrogen distribution ratio between the slag and a metal with a given Al content.

For slag systems containing titanium oxides, $L_N$ between the slag and a metal with a given Ti content is useful for estimating the maximum Ti pick-up by metal. As the $L_N$ of a slag at a given Ti content in metal increases, the amount of slag necessary for nitrogen removal decreases and consequently the possible Ti pick-up decreases. Referring to the previous discussion about the activity coefficient of AlN in slag, the usefulness of the activity coefficient of TiN in a slag can be derived from the nitrogen equilibrium between Ti and N in metal and TiN in slag as follows $$(TiN) = \underline{Ti} + \underline{N} \quad (12)$$

$$K_{TiN} = \frac{a_{Ti} a_N}{a_{TiN}} = \frac{f_{Ti}(\%\underline{Ti}) f_N(\%\underline{N})}{r_{TiN} x_{TiN}} \quad (13)$$

$$K_{TiN} = \exp\left(\frac{-19800}{T} + 7.78\right) \quad (14)$$

where $K_{TiN}$ is the equilibrium constant of Eq.(12); $a_{Ti}$ and $f_{Ti}$ are the activity and activity coefficient of Ti in metal, respectively; $a_{TiN} r_{TiN}$ and $x_{TiN}$ represent the activity, activity coefficient and molar fraction of TiN in slag, respectively. The relationship between the nitrogen distribution ratio of slag and metal, and the activity coefficient of TiN can be derived from Eq.(13) as $$r_{TiN} = \frac{(\% \underline{Ti}) f_{\underline{N}} f_{\underline{Ti}}}{L_N K_{TiN} (M_{slag}/100 M_N)} \quad (15)$$

Once the nitrogen distribution ratio between a specific slag and a metal with known Ti content has been measured, the activity coefficient of TiN can be obtained according to Eq. (15). Also, nitrogen distribution ratio between a slag with known activity coefficient of TiN and a metal with a given Ti content can be readily determined according to the following relation.

$$L_N = \frac{(\% \underline{Ti}) f_{\underline{N}} f_{\underline{Ti}}}{r_{TiN} K_{TiN} (M_{slag}/100 M_N)} \quad (16)$$

Eq.(16) indicates that $L_N$ is inversely proportional to $r_{TiN}$, i.e., decreasing the activity coefficient of TiN in a slag, increasing the nitrogen distribution ratio between the slag and a metal with a given Ti content. Therefore, $r_{TiN}$ of a slag is a more suitable index than nitride capacity $C_N$ and $C'_N$ of the slag to predict the nitrogen distribution ratio between the slag and a metal with a given Ti content and to estimate the maximum Ti pick-up.

Slag systems containing $TiO_x$ (x=1.5-2 for co-existence of $TiO_2$ and $Ti_2O_3$) have shown the highest nitride capacities, which indicates the titanium ion in the slags is the most effective species to absorb nitrogen. Titanium ion may exist in slag as $Ti^{4+}$, $Ti^{3+}$ and $Ti^{2+}$. These three types of titanium ions may have different effects on nitride capacity. According to the Gibbs free energy for the following reactions between the three types of titanium oxides,

$$TiO_2(s) = TiO_{1.5}(s) + 1/4 O_2(g) \quad (17)$$

$$\Delta G^\circ = 189954 - 48.53T \quad J \quad (18)$$

$$TiO_{1.5}(s) = TiO(s) + 1/4 O_2(g) \quad (19)$$

$$\Delta G^\circ = 236396 - 54.98T \quad J \quad (20)$$

The equilibrium oxygen potentials for Eq.(17) and Eq.(19) are calculated at 1873K to be $9 \times 10^{-12}$ atm and $1.2 \times 10^{-15}$ atm, respectively. When the $Ti^{2+}$ ion predominates among titanium ions in slag, the oxygen potential in slag will be below $1.2 \times 10^{-15}$ atm, assuming the activity coefficients of all titanium oxides are unity. If $Ti^{3+}$ predominates, the oxygen potential will be between $1.2 \times 10^{-15}$ and $9 \times 10^{-12}$ atm. In the case that $Ti^{4+}$ predominates, the oxygen potential will be above $9 \times 10^{-12}$ atm. Therefore, $Ti^{3+}$-containing slag or $Ti^{2+}$-containing slag has higher nitrogen removal ability than $Ti^{4+}$-containing slag due to lower oxygen potential in $Ti^{3+}$-containing slag and $Ti^{2+}$-containing slag, bearing in mind that lower oxygen potential expedites nitrogen removal.

Using slag compositions initially containing $TiO_2$, a part of $TiO_2$ was found to be reduced to form $Ti_2O_3$ after reaching slag-metal or slag-gas equilibrium. Consequently, $TiO_2$ and $Ti_2O_3$ coexisted at a ratio of $Ti^{3+}/(Ti^{4+}+Ti^{3+})$ in slag from less than 5% to higher than 30%. No significant difference in the effects of $Ti^{3+}$ and $Ti^{4+}$ on nitride capacity was observed most likely due to the fact that a) a fair degree of scattering existed in measured nitride capacity data and b) $Ti^{3+}$ content was small. However, experimental study of Ti—O—N ternary phase diagram revealed significant difference in nitrogen solubility for the three types of titanium oxides. For the Ti—O—N system with Ti/O molar ratios of 1, 1.5 and 2, nitrogen solubility measured to be 7.5 wt %, 1.7 wt % and negligibly small respectively, at 1650° C. and $P_{N_2}$=0.86 atm. Therefore, it appears that slags containing $Ti_2O_3$ are more effective at nitrogen removal than slags containing $TiO_2$ and slag compositions containing TiO exceed $Ti_2O_3$ slags.

Slag compositions having less than 10 wt % of titanium oxide can often be less effective at reducing the nitrogen content of metals while slag compositions having more than about 40 wt % titanium oxide tend to be highly viscous when molten which inhibits their effectiveness in nitrogen removal. The slag composition can also include from about 60 wt % to about 90 wt % of a metal oxide. The metal oxide component of the slag composition can be formulated so that the melting point of the slag is reduced. Any combination of metal oxides which can achieve a reduced melting point for the slag without causing unwanted side effects to the processed metal or the nitrogen removal can be used. Generally, the metal oxide can comprise from about 60 wt % to about 90 wt % of the slag composition. Examples of metal oxides which can be used in the slag compositions of the present invention include but are not limited to aluminum oxides, calcium oxides, magnesium oxides, silicon oxides, and combinations thereof. In one embodiment, the slag composition includes or consists essentially of, CaO, $Al_2O_3$, and TiO. In another embodiment, the slag composition includes or consists essentially of CaO, $Al_2O_3$, and a mixture of $Ti_2O_3$ and TiO.

EXAMPLE

In this example, the effectiveness of two slag systems, TiO slag and $Ti_2O_3$ slag, has been experimentally shown by measuring and comparing their nitrogen distribution ratio with that of the $TiO_2$ slag and CaO—$Al_2O_3$ slag. Thermodynamic calculations indicate that TiO can be oxidized to be $Ti_2O_3$ at an oxygen potential higher than $1.2\times10^{-15}$ atm. $Ti_2O_3$ is oxidized to $TiO_2$ at higher than $9\times10^{-12}$ atm but $TiO_2$ can be reduced to be $Ti_2O_3$ at oxygen potential lower than $9\times10^{-12}$ atm. In addition, $Ti_2O_3$ is reduced to TiO at an oxygen potential lower than $1.2\times10^{-15}$ atm. Therefore, specific atmospheric conditions are necessary to prevent or at least minimize the oxidizing or reducing interference on titanium oxides in slag, e.g. low oxygen potential and inert atmosphere as described more fully below.

In conventional slag-metal and slag-gas equilibration studies, a reducing atmosphere by flowing a mixture of $N_2$—$H_2$ with a small amount of $H_2O$ were used, with oxygen potential of $10^{-11}$ to $10^{-14}$ atm. However, this reducing gas mixture is not applicable to the present work, since it can be difficult to pre-determine and maintain suitable oxygen potential for the various slag compositions in order to minimize oxidation or reduction of titanium oxides in slag. It should be pointed out that the oxygen potential values mentioned above are calculated by taking the activity coefficients of unity for all titanium oxides in slag and are thus only relative values rather than absolute. Thus, the actual values of oxygen potential to minimize the oxidation or reduction of titanium oxides are unknown and vary between slag systems and compositions.

An inert atmosphere with extremely low oxygen potential is considered to be suitable for the present example. Oxygen impurity in Ar can be removed with a highly reactive metal such as Ti and Zr to obtain an oxygen potential below $10^{-20}$ atm, which prevents the oxidation of any titanium oxides. For the inert atmosphere employed in this example, there is no need to keep a deoxidized Ar flow through the experimental zone. A static Ar atmosphere around the slag-metal system was deeply deoxidized by the highly reactive metal powders placed nearby the slag-metal system. The Ar atmosphere around the slag-metal system can be maintained with an extremely low oxygen potential.

Figure 1:
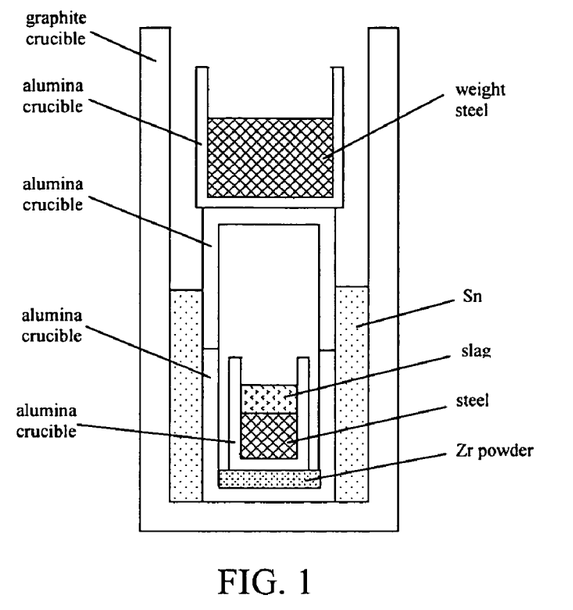
FIG. 1 is a schematic of a device in accordance with a liquid sealing process embodiment of the present invention.

The experimental setup of the liquid sealing unit is shown in FIG. 1. In this method, Sn was selected for liquid sealing because of a low melting point and high boiling point. Zirconium was used to absorb residual oxygen in the sealed zone to achieve extremely low oxygen potential. An alumina crucible containing pure TiO powders was placed in the sealed zone at the experimental temperature and there was no oxidation by XRD analysis.

The experimental procedure included placing the liquid sealing unit into the furnace tube, reducing the pressure of the furnace tube to less than $10^{-2}$ torr, introducing high purity Ar into the furnace tube to let the pressure in the furnace tube recover as 1 atm, and starting to heat up the furnace. After the temperature reaches the melting point of Sn, the powders of Sn melt to form a liquid seal for the space inside the two outer alumina crucibles which are connected to each other. As the temperature increases, gases in the sealed space (mostly Ar and a very small amount of oxygen) expanded to raise the pressure in the sealed space. Therefore, some of the gases escaped as rising bubbles through liquid Sn so the pressures inside and outside the sealed space remain balanced around 1 atm. A tiny amount of oxygen remained in the sealed space when the liquid seal forms. This residual oxygen was absorbed by Zr powder during heating-up to obtain an extremely low oxygen potential in the sealed space. After reaching the desired temperature and maintaining the temperature for desired time, the power of the furnace was turned off to cool down. During the cooling-down, the pressure in the sealed space decreased. Therefore, the pressure outside the sealed space has to be lowered down accordingly with the temperature, so that the pressures inside and outside the sealed space remain balanced. When the temperature was lowered down to around 300° C., the pressure balance inside and outside the sealed space can be adjusted by increasing the pressure outside the sealed space to 1 atm. Finally, the liquid sealing unit was removed rapidly from the furnaces to cool down.

Figure 2:
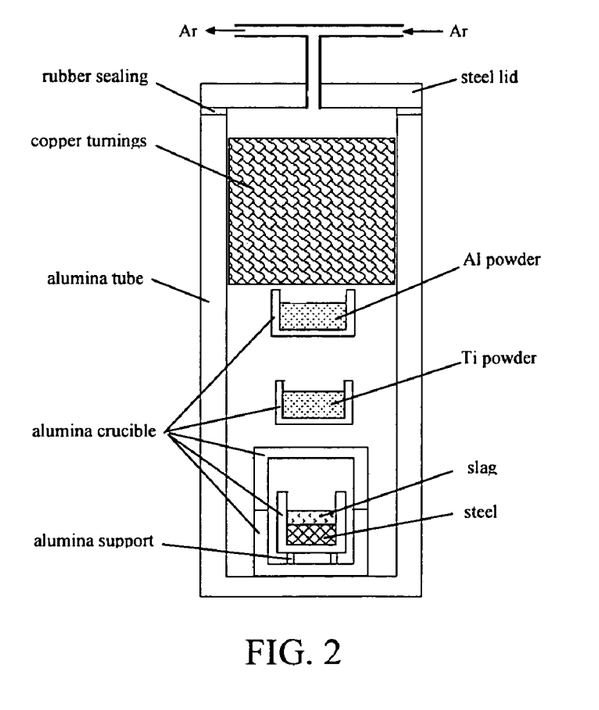
FIG. 2 is a schematic of a device in accordance with a static atmosphere process embodiment of the present invention.

As shown in FIG. 2, the reaction zone is not insulated in the static atmosphere method. Purified Ar flow with about 1 ppm of oxygen was continuously maintained throughout the experiments. Ar flow is necessary to maintain the pressure balance in the reaction zone during heating and cooling. The atmosphere in the reaction zone is static or convection-free, but the residual oxygen in Ar can diffuse into the reaction zone. Because 1 ppm oxygen is still too high to prevent TiO and $Ti_2O_3$ from oxidation, strong deoxidizers, titanium powder, aluminum powder and copper turnings, are placed in the reaction zone to continuously lower residual oxygen in the reaction zone to extremely low level. The effectiveness of obtaining extremely low oxygen potential in the reaction zone by this method was also verified by XRD analysis of Ti, Al and TiO powders placed separately in the reaction zone. The experimental analysis showed only a very small part of the Ti powder was oxidized into $Ti_3O$ or $Ti_2O$ while Al and TiO powders were not oxidized. The experimental procedure was as follows: maintain a highly pure Ar atmosphere in the reaction zone after flushing the reaction zone several times with dried highly pure Ar with repeated evacuation by vacuum and Ar introduction; heat up to desired temperature and maintain the temperature for desired period of time; and then cool down to room temperature.

The slag compositions were prepared from mixtures of reagent grade CaO, $Al_2O_3$, TiO, $Ti_2O_3$ and $TiO_2$. Steel is a common low carbon metal composed of 0.0090 N, 0.025 Al, 0.0011 Ti, 0.163 C, 0.172 Si, 0.709 Mn, 0.0062 P, 0.035 S and 0.085 Cr in weight %. In some experiments, reagent grade NbN powder was placed under the steel as an attempt to supply more nitrogen for the metal-slag system through NbN's dissolution into molten steel. Nitrogen contents in slag and steel samples were analyzed by inert gas fusion method. Ti, Al, and Nb in steel samples were analyzed by optical emission spectrometry. Although the slag compositions tested included titanium oxides, calcium oxide, and aluminum oxide, other metal oxides can be used in place of calcium and/or aluminum oxide.

Experimental conditions and chemical compositions of the slag and metal samples are summarized in Table I.

for $40\%CaO-40\%Al_2O_3-20\%\ Ti_2O_3$. The $L_N$ for $40\%CaO-40\%Al_2O_3-20\%TiO_x$ is located between $40\%CaO-40\%Al_2O_3-20\%TiO_2$ and $40\%CaO-40\%Al_2O_3-20\%Ti_2O_3$. The $L_N$ for TiO slag is found to be 10-20 times higher than that of $Ti_2O_3$ slag and $TiO_2$ slag with same Al content in metal. The effectiveness of the $TiO_x$ slag compositions of the present invention is extraordinary.

As discussed in the previous section, the activity coefficient of AlN, $r_{AlN}$, in a slag is a more suitable index than nitride capacityc $C_N$ to predict the nitrogen distribution ratio between the slag and a metal at a given Al content. Decreasing the $r_{AlN}$ in a slag increases the $L_N$ for a given Al content, and thus increases the ability of the slag to remove nitrogen from the metal. The $r_{AlN}$ for the slags in this example and for a few comparative slags have been calculated from available data of $L_N$ and Al content in metal using Eq.(10), where $f_{Al}$ and $f_N$

TABLE I

Initial slag compositions, experimental methods, final metal and slag compositions

| initial slag compositions | method | time, h | final metal, % | | | | final slag | |
|---|---|---|---|---|---|---|---|---|
| | | | (Ti) | (Al) | (Nb) | (N) | (N), % | $L_N$ = (N)/(N) |
| 50%CaO—50%$Al_2O_3$ | SA | 4 | 0 | 0.035 | 0 | 0.0093 | 0.035 | 3.8 |
| 40%CaO—40%$Al_2O_3$—20%$TiO_2$ | A | 4 | 0.053 | 0.008 | 0 | 0.0023 | 0.028 | 12.2 |
| 40%CaO—40%$Al_2O_3$—20%$TiO_2$ | LS* | 18 | 0.145 | 0.021 | 0.62 | 0.0059 | 0.09 | 15.3 |
| 40%CaO—40%$Al_2O_3$—20%$Ti_2O_3$ | SA | 4 | 0.153 | 0.017 | 0 | 0.0069 | 0.2 | 29.0 |
| 40%CaO—40%$Al_2O_3$—20%$Ti_2O_3$ | LS | 18 | 0.256 | 0.024 | 0 | 0.0058 | 0.28 | 48.3 |
| 40%CaO—40%$Al_2O_3$—20%TiO | LS | 18 | 0.51 | 0.04 | 0 | 0.0003 | 0.26 | 866.7 |
| 40%CaO—40%$Al_2O_3$—20%TiO | LS* | 18 | 0.88 | 0.073 | 0.2 | 0.0006 | 0.25 | 416.7 |
| 35%CaO—35%$Al_2O_3$—30%TiO | SA | 4 | 0.42 | 0.035 | 0 | 0.0005 | 0.26 | 520.0 |
| 35%CaO—35%$Al_2O_3$—30%TiO | LS* | 18 | 0.44 | 0.034 | 1.4 | 0.0012 | 0.66 | 550.0 |

LS: liquid sealing;
SA: static atmosphere;
A: flowing Ar;
*NbN added to steel

Figure 3:
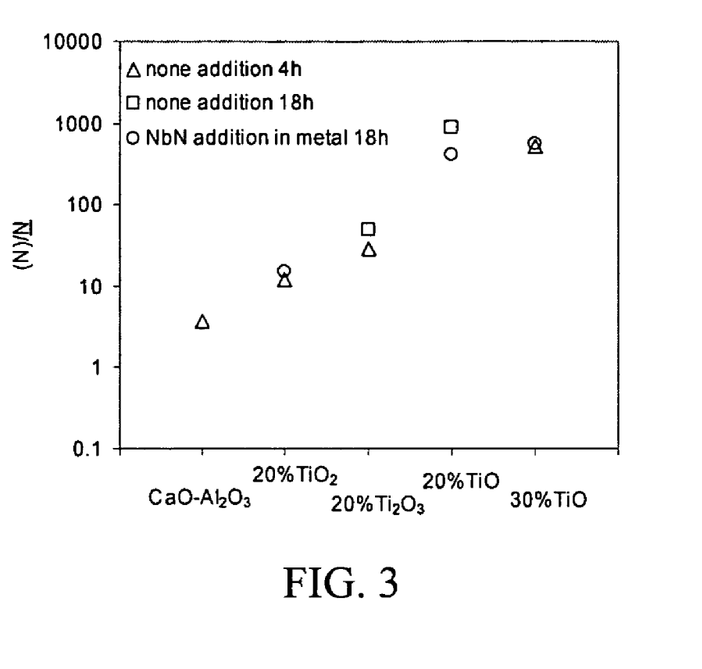
FIG. 3 is a graph of nitrogen distribution ratios for several slag compositions at 1873 K in accordance with an embodiment of the present invention.

Nitrogen distribution ratios of the various slag systems measured are plotted as a function of slag compositions in FIG. 3. The nitrogen distribution ratios for $40\%CaO-40\%Al_2O_3-20\%Ti_2O_3$, $40\%\ CaO-40\%Al_2O_3-20\%$ TiO and $35\%CaO-35\%Al_2O_3-30\%TiO$ are higher than that of $40\%CaO-40\%Al_2O_3-20\%TiO_2$ and $50\%CaO-50\%Al_2O_3$. In particular, the nitrogen distribution ratio for TiO slag is as high as over 500 and significantly higher than that of other slags. The value of nitrogen distribution ratio for TiO slag is approximately 120, 30 and 12 times greater than the CaO—$Al_2O_3$, $TiO_2$ slag and $Ti_2O_3$ slag, respectively. There is no significant difference in $L_N$ values between 20% TiO slag and 30% TiO slag.

Figure 4:
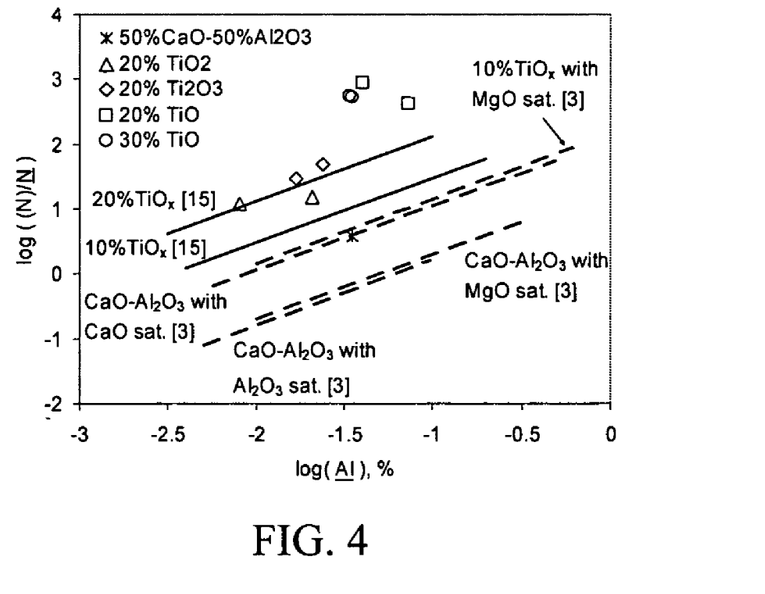
FIG. 4 is a log graph of nitrogen distribution ratios and aluminum content in accordance with an embodiment of the present invention.

As mentioned above, $L_N$ for slags containing $Al_2O_3$ increases with Al content in metal, since Al/($Al_2O_3$) is usually the controlling redox pair and thus oxygen potential decreases with increasing Al content in metal. It is reasonable and practical to compare $L_N$ values of slags at fixed Al content, especially at around 0.05% Al in steel. The variation of $L_N$ values with Al content in steel is plotted in FIG. 4 using the data obtained from this study and literature. Specifically, $L_N$ of CaO—$Al_2O_3$ is considerably smaller than that of slags containing titanium oxides. Higher $L_N$ for CaO—$Al_2O_3$ with CaO saturation and MgO saturation may be attributed to the significant decrease of $Al_2O_3$ activity with increasing CaO and MgO contents.

Comparing $40\%CaO-40\%Al_2O_3-20\%TiO_x$ slag and $45\%CaO-45\%Al_2O_3-10\%TiO_x$ slag indicates that $L_N$ increases with titanium oxide content in slag. $L_N$ for $40\%CaO-40\%Al_2O_3-20\%TiO_2$ is slightly smaller than that were calculated from available interaction parameters. The obtained $r_{AlN}$ is plotted against slag compositions in FIG. 5.

Figure 5:
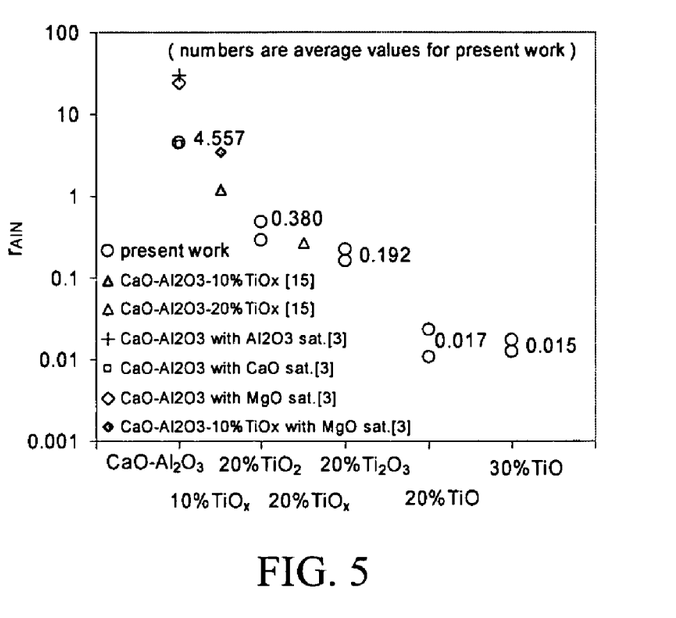
FIG. 5 is a graph of activity coefficient for several slag compositions in accordance with an embodiment of the present invention.

Comparing the $r_{AlN}$ of CaO—$Al_2O_3$, $45\%CaO-45\%Al_2O_3-10\%TiO_x$ and $40\%CaO-40\%Al_2O_3-20\%TiO_x$ indicates that $r_{AlN}$ increases with $TiO_x$ content in slag. $r_{AlN}$ of $40\%CaO-40\%Al_2O_3-20\%Ti_2O_3$ is smaller than that of 40% $CaO-40\%Al_2O_3-20\%TiO_2$. $r_{AlN}$ of $40\%CaO-40\%Al_2O_3-20\%TiO_x$ is smaller than that of $40\%CaO-40\%Al_2O_3-20\%TiO_2$ in this example but bigger than that of $40\%CaO-40\%Al_2O_3-20\%Ti_2O_3$. $40\%CaO-40\%Al_2O_3-20\%TiO$ and $35\%CaO-35\%Al_2O_3-30\%TiO$ have similar values of $r_{AlN}$ which are much smaller than other slags.

Figure 6:
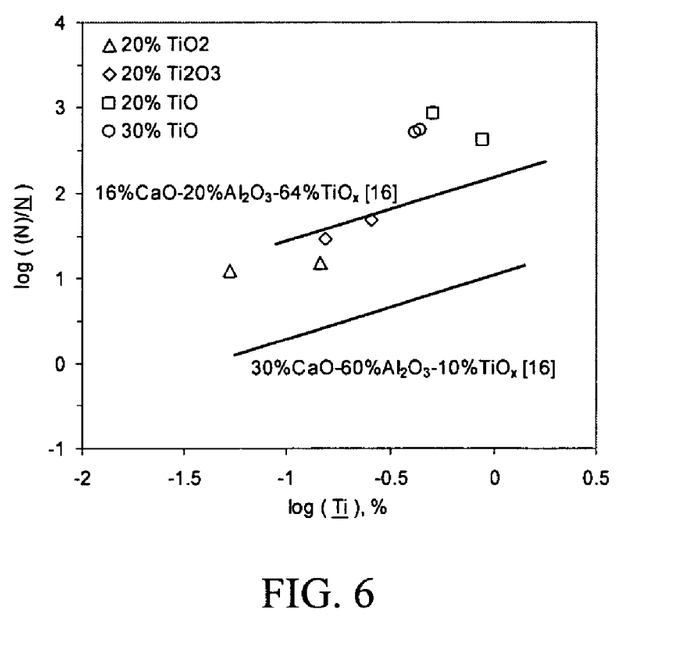
FIG. 6 is a log graph of nitrogen distribution ratios and titanium content in accordance with an embodiment of the present invention.

Higher nitrogen distribution ratio for slags containing titanium oxides at a given Ti content in steel is desirable to suppress possible Ti pick-up by steel. In order to compare $L_N$ at the same Ti content in metal, log ($L_N$) of different slags is plotted against log (% Ti) in FIG. 6. Comparing the $L_N$ of $16\%CaO-20\%Al_2O_3-64\%TiO_x$, $30\%CaO-60\%Al_2O_3-10\%TiO_x$ to $40\%CaO-40\%Al_2O_3-20\%TiO_2$ in this example indicates that $L_N$ increases with $TiO_2$ content in slag. However, there is only very limited increase in $L_N$ after the $TiO_2$ content exceeds 20%. $L_N$ of 20% $Ti_2O_3$ slag is found to be slightly higher than that of 20% $TiO_2$ slag. $L_N$ values of 20% TiO slag and 30% TiO slag are significantly higher than that of 20% $TiO_2$ slag and 64% $TiO_x$ slag. This results clearly demonstrate the exceptional ability of TiO slag to remove nitrogen based on its high $L_N$ at a given Al content in steel and its small $r_{AlN}$. The higher $L_N$ of TiO slag at a given Ti content in steel indicates that TiO slag is more efficient at suppressing possible Ti pick-up by steel than other slags.

Figure 7:
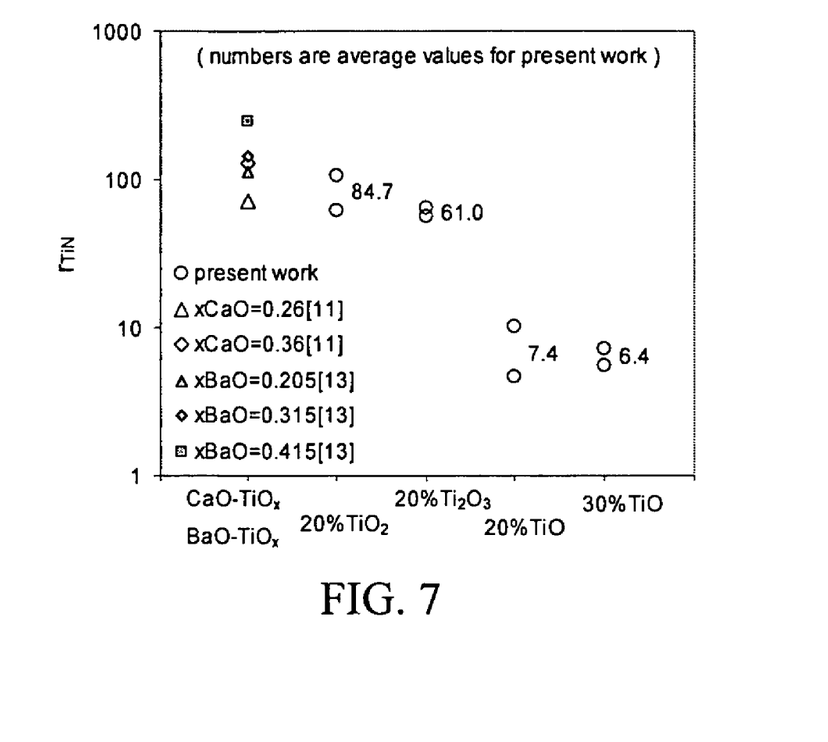
FIG. 7 is a graph of activity coefficients of TiN for several slag compositions in accordance with an embodiment of the present invention.

The activity coefficient of TiN in slag, $r_{TiN}$, is calculated for slags employed in this example according to Eq.(15) and plotted against slag compositions in FIG. 7 with a few comparative $r_{TiN}$ data for CaO—TiO$_x$ and BaO—TiO$_x$ slags. The $r_{TiN}$ of CaO—Al$_2$O$_3$-20%Ti$_2$O$_3$ is slightly smaller than that of CaO—Al$_2$O$_3$-20%TiO$_2$. CaO—TiO$_x$ and BaO—TiO$_x$ have similar $r_{TiN}$ values as CaO—Al$_2$O$_3$-20%TiO$_2$, even though the former two slags have higher TiO$_x$ content. This indicates that neither the TiO$_2$ slag nor the Ti$_2$O$_3$ slag are effective suppressors of Ti pick-up by metal. The $r_{TiN}$ of 31.5%BaO—TiO$_x$ is found to be slightly larger than the average value of $r_{TiN}$ of CaO—TiO$_x$ slags with 26% of CaO and 36% of CaO, suggesting that the substitution of CaO by BaO (with respect of molar fraction) does not effectively suppress Ti pick-up. The 20% TiO slag and 30% TiO slag have similar $r_{TiN}$ values that are substantially smaller than those of the other slags. The smaller $r_{TiN}$ and $r_{AlN}$ of TiO slag lead the slag to the highest degree of nitrogen removal with the smallest Ti pick-up.

Figure 8:
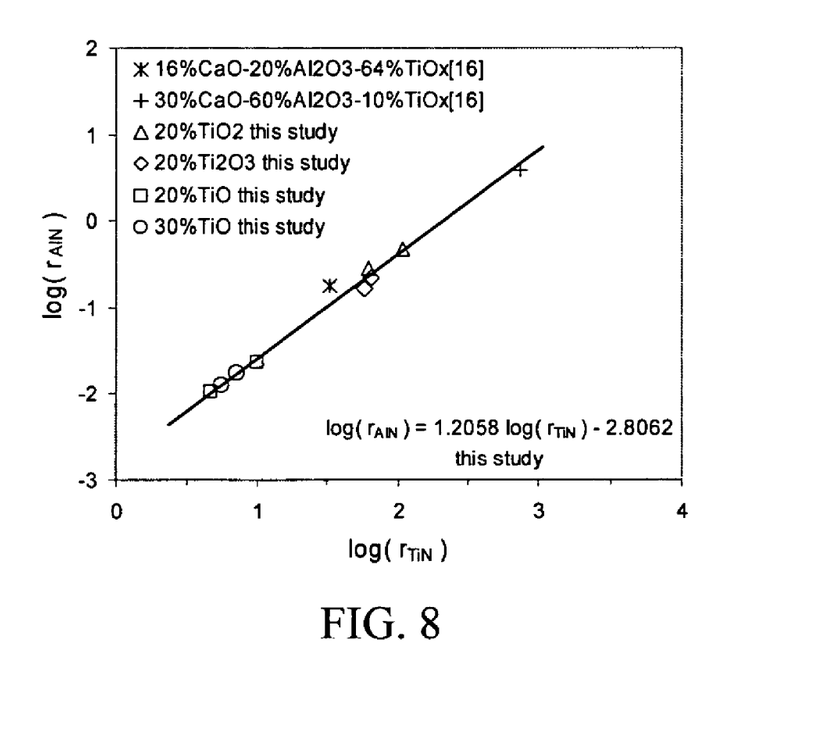
FIG. 8 is a log graph of activity coefficients of AlN and TiN in accordance with an embodiment of the present invention.

A good linear relationship between $\log(r_{AlN})$ and $\log(r_{TiN})$ is observed for CaO—Al$_2$O$_3$—(TiO$_2$, Ti$_2$O$_3$, or TiO) slag systems as shown in FIG. 8, indicating that $r_{TiN}$ is proportional to $r_{AlN}$ within a broad range of compositions in CaO—Al$_2$O$_3$—(TiO$_2$, Ti$_2$O$_3$, or TiO) slag systems. TiO slag has the lowest $r_{TiN}$ and the lowest $r_{AlN}$. Therefore, adjusting TiO slag composition to lower $r_{TiN}$ further for minimum Ti pick-up can be useful since low $r_{AlN}$ of TiO slag leads to a sufficiently high nitrogen distribution ratio to meet the practical nitrogen removal requirements. A lower $r_{AlN}$ is expected for a slag with a lower $r_{TiN}$ according to the relationship between $r_{TiN}$ and $r_{AlN}$, so it is unlikely that a high $r_{AlN}$ occurs for a slag with low $r_{TiN}$. The observed relationship between $r_{TiN}$ and $r_{AlN}$ may be attributed to the similar physical and chemical nature of TiN and AlN.

Figure 9:
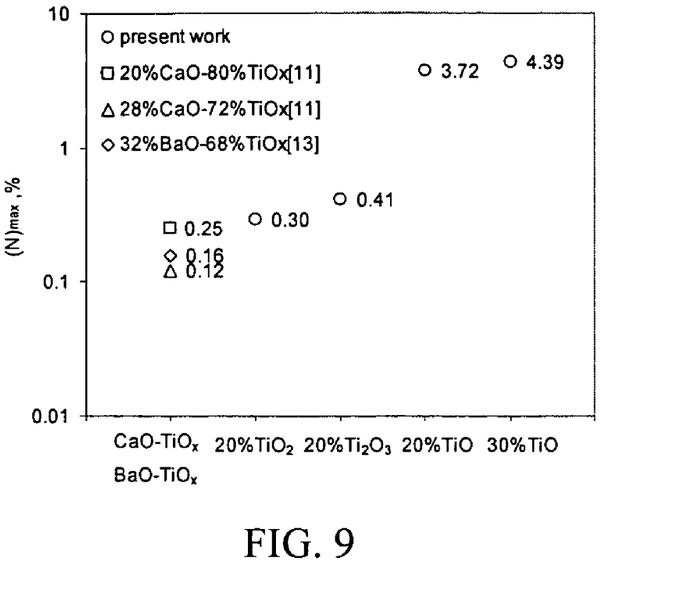
FIG. 9 is a graph of TiN solubility in several slag compositions at 1873 K, where (N)max is the equivalent N content at TiN saturation in accordance with an embodiment of the present invention.

The solubility of TiN and the equivalent solubility of N in slag can be calculated from $r_{TiN}$ according to the following equations:

$$(x_N)_{max} = (x_{TiN})_{max} = \frac{1}{r_{TiN}} \quad (21)$$

$$(\%N)_{max} = \frac{100(x_N)_{max} M_N}{(x_N)_{max} M_N + (1-(x_N)_{max}) M_{slag}} \quad (22)$$

where $(x_{TiN})_{max}$ is TiN solubility in molar fraction; $(x_N)_{max}$ and $(\%N)_{max}$ are the equivalent N contents in molar fraction and weight percent, respectively; $M_N$ and $M_{slag}$ are the molar weight of N atom and the average molar weight of slag. The calculated $(\%N)_{max}$ for slags in this study and the measured $(\%N)_{max}$ for CaO—TiO$_x$ and BaO—TiO$_x$ are plotted against slag compositions in FIG. 9. It is seen that the TiO slag has significantly higher TiN solubility than the TiO$_x$ slag, TiO$_2$ slag and Ti$_2$O$_3$ slag. TiN solubility in TiO$_x$ slag, TiO$_2$ slag and Ti$_2$O$_3$ slag are very limited even for those slags containing as high as 80% of TiO$_x$. The high solubility of TiN in TiO slag supports the fact that an unlimited mutual solution of TiN$_x$O$_y$ can be formed from TiN and TiO.

In order to estimate the maximum nitrogen removal by a slag, it is necessary to find nitrogen distribution ratio between the slag and the steel with a given Al content. Estimation is generally made for steels containing 0.05% Al at 1873K. The measured values of $L_N$ are not completely suitable in this case since Al is not always measured at 0.05% in steel. Therefore, $L_N$ at 0.05% Al needs to be calculated from $r_{AlN}$ using Eq.(11) obtained in the previous section.

$$L_N = \frac{(\%\underline{Al})f_{\underline{N}}f_{\underline{Al}}}{r_{AlN} K_{AlN}(M_{slag}/100M_N)} \quad (11)$$

As long as $L_N$ is available, the limit of nitrogen removal by a slag can be estimated by the following equation derived from mass balance of nitrogen:

$$\underline{N}_f = \frac{\underline{N}_i}{(1+L_N W_s/1000)} \quad (23)$$

where $\underline{N}_f$ and $\underline{N}_i$ are the final and initial contents of nitrogen in steel in ppm, respectively; $W_s$ is the slag consumption in kg/ton steel.

Figure 10:
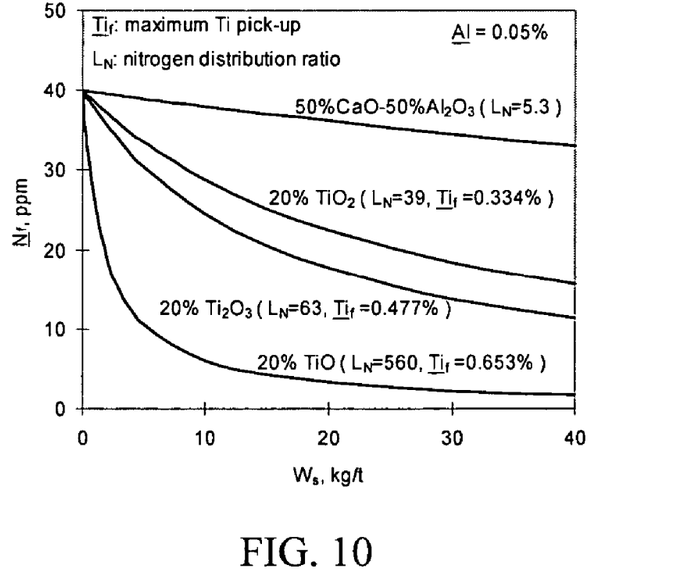
FIG. 10 is a graph of nitrogen removal limit of several slag compositions at 0.05% Al in steel at 1873 K in accordance with an embodiment of the present invention.

Assuming $\underline{N}_i$=40 ppm and $\underline{Al}$=005%, for 50%CaO-5%Al$_2$O$_3$, 40%CaO-40%Al$_2$O$_3$-20%TiO$_2$, 40%CaO-40%Al$_2$O$_3$-20%Ti$_2$O$_3$ and 40%CaO-40%Al$_2$O$_3$-20%TiO slags, $\underline{N}_f$ is calculated using Eq.(23) as a function of $W_s$. $\underline{N}_f$ is plotted against $W_s$ as a function of slag compositions in FIG. 10. It is clear that the TiO slag exhibits a minimum amount of $\underline{N}_f$ and the slag's ability to remove nitrogen is as follows:

TiO slag>>Ti$_2$O$_3$ slag.

The required amount of slag to remove nitrogen is significantly smaller for TiO slag than the other slags. For example, in order to decrease nitrogen from 40 ppm to 20 ppm, slag consumptions will be 1.8, 16, 26 and 189 kg/ton for TiO slag, Ti$_2$O$_3$ slag, TiO$_2$ slag and CaO—Al$_2$O$_3$ slag, respectively.

For TiO$_2$, Ti$_2$O$_3$ or TiO-containing slag, the maximum Ti pick-up by steel containing 0.05% Al can be calculated using Eq.(24), which is derived from combining Eqs.(10) and (15) to describe the simultaneous equilibria of Al—N and Ti—N, $$(\%\underline{Ti}) = (\%\underline{Al})\frac{r_{TiN} K_{TiN}}{r_{AlN} K_{AlN}} \quad (24)$$

The values of Ti pick-up are indicated in FIG. 10. Actual Ti pick-up values are predicted to be less than the calculated values. The actual Ti pick-up can not be estimated at present time, because there is no data concerning Ti pick-up kinetics. It is noted that the Ti pick-up values in FIG. 10 are obtained for steel containing 0.05% of Al. As indicated by Eq.(24), Ti pick-up is decreased by lowering Al content in steel. For the steel grades that need to minimize Ti pick-up, Al content in steel needs to be controlled at a lower level during the nitrogen removal operation. This can be accomplished by modifying the deoxidation operation for steel: decreasing Al addition before nitrogen removal operation and adding a specific amount of Al after nitrogen removal operation. In this case, nitrogen removal limit can be estimated for a given Ti content in steel, e.g., Ti=0.05%, according to Eq. (16) obtained in the previous section $$L_N = \frac{(\%\underline{Ti})f_{\underline{N}}f_{\underline{Ti}}}{r_{TiN} K_{TiN}(M_{slag}/100M_N)} \quad (16)$$

with the following calculation procedure: a) calculating $\underline{fN}$ from the interaction parameter of N in steel at 0.05% Ti; b) calculating $L_N$ according to Eq.(16); and c) calculating $\underline{N}_f$ according to Eq.(23).

Figure 11:
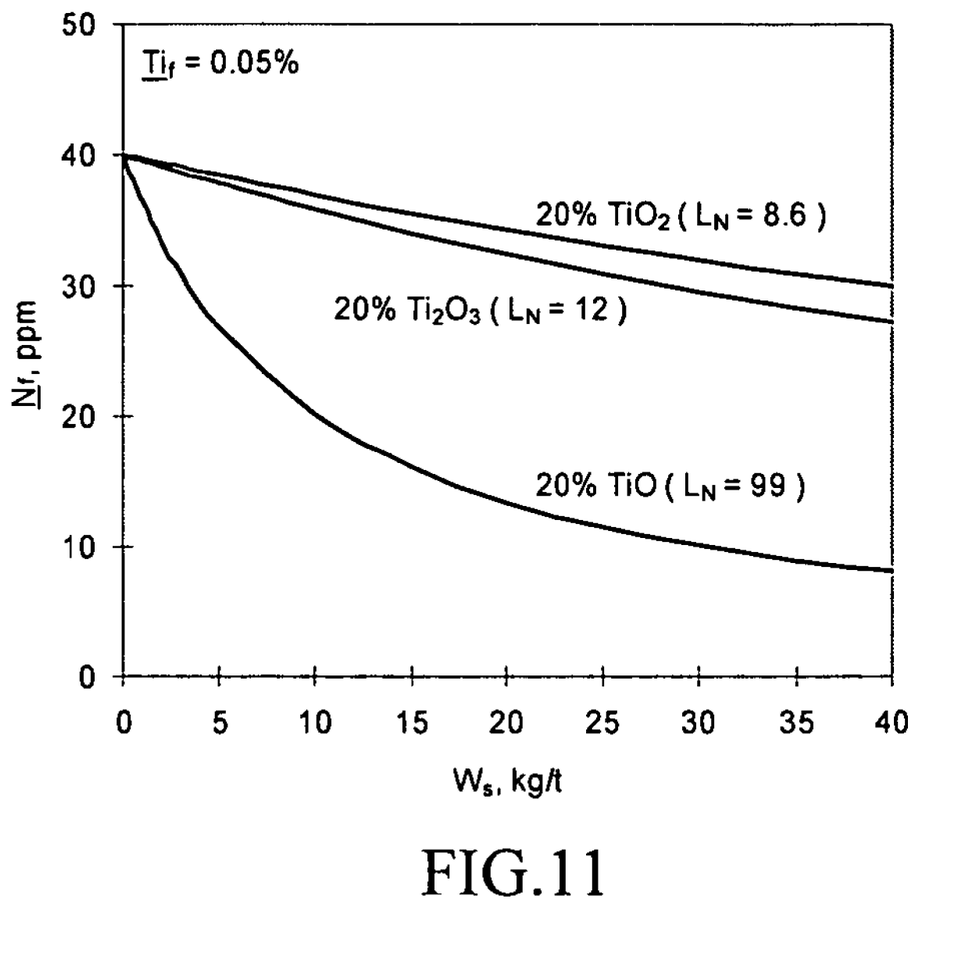
FIG. 11 is a graph of nitrogen removal limit of several slag compositions at 0.05% Ti in steel at 1873 K in accordance with an embodiment of the present invention.

FIG. 11 shows that both $TiO_2$ slag and $Ti_2O_3$ slag have very limited nitrogen removal ability if the maximum Ti pick-up is restricted to less than 0.05%. Under this condition, TiO slag can still remove nitrogen effectively, but not as effectively as 0.05% Al, because oxygen potential at 0.05% Ti is not as low as that at 0.05% Al. The lower oxygen potential decreases the nitrogen distribution ratio for all slags as seen by comparing nitrogen distribution ratios in FIG. 11 with FIG. 10.

It is to be understood that the above-referenced arrangements are illustrative of the application for the principles of the present invention. Thus, while the present invention has been described above in connection with the exemplary embodiments of the invention, it will be apparent to those of ordinary skill in the art that numerous modifications and alternative arrangements can be made without departing from the principles and concepts of the invention as set forth in the claims.

What is claimed is:

1. A method of removing nitrogen from metal, comprising the step of: a) placing a slag composition including a titanium oxide in contact with a metal mass, said titanium oxide having the formula $TiO_x$, where x is from 1 to less than 1.5, wherein the step of contacting occurs in a reducing atmosphere having an oxygen potential below $10^{-20}$ atm.

2. The method of claim 1, further comprising the steps of: b) subjecting the slag composition and metal mass to a temperature and for a time sufficient to substantially melt the metal mass to form a molten metal mass such that nitrogen in the metal mass migrates toward the slag composition to form a denitrogenated metal; and c) recovering the denitrogenated metal.

3. The method of claim 2, wherein the step of placing the slag composition in contact with a metal mass includes injecting the slag composition into the molten metal mass.

4. The method of claim 2, wherein the temperature is above a melting temperature of the metal mass.

5. The method of claim 1, wherein x is from 1 to less than 1.3.

6. The method of claim 1, wherein x is 1.

7. The method of claim 1, wherein the slag composition has the titanium oxide in a content from about 10 wt % to about 40 wt %.

8. The method of claim 7, wherein the slag composition has a titanium oxide content from about 20 wt % to about 30 wt %.

9. The method of claim 1, wherein the slag composition includes from about 60 wt % to about 90 wt % of a metal oxide selected from aluminum oxides, calcium oxides, magnesium oxides, silicon oxides, and combinations thereof.

10. The method of claim 1, wherein the slag composition farther comprises a metal oxide which reduces the melting point of the titanium oxide component.

11. The method of claim 1, wherein the slag composition consists essentially of titanium monoxide, calcium oxide, and aluminum oxide.

12. The method of claim 1, wherein the metal mass is steel.

13. The method of claim 1, wherein the slag composition and the metal mass are contacted having a weight ratio of slag composition to metal mass from about 1:50 to about 1:200.

14. A method of removing nitrogen from metal, comprising the step of: a) placing a slag composition including a titanium oxide in contact with a metal mass, wherein contacting occurs in a reducing atmosphere having an oxygen potential below $10^{-20}$ atm, and said titanium oxide having the formula $TiO_x$, where x is from 1 to less than 1.5, wherein the slag composition and the metal mass are contacted having a weight ratio of slag composition to metal mass from about 1:50 to about 1:200.

\* \* \* \* \*

UNITED STATES PATENT AND TRADEMARK OFFICE
CERTIFICATE OF CORRECTION

| | | |
|---|---|---|
| PATENT NO. | : 7,655,066 B2 | Page 1 of 1 |
| APPLICATION NO. | : 11/453302 | |
| DATED | : February 2, 2010 | |
| INVENTOR(S) | : Fan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 549 days.

Signed and Sealed this

Twenty-third Day of November, 2010

David J. Kappos
*Director of the United States Patent and Trademark Office*